(12) United States Patent
Walker-Stern et al.

(10) Patent No.: US 10,930,949 B2
(45) Date of Patent: Feb. 23, 2021

(54) POWER DELIVERY SYSTEM AND METHOD

(71) Applicant: ESS Tech, Inc., Wilsonville, OR (US)

(72) Inventors: Isaac Walker-Stern, Portland, OR (US); Aaron Vanderzanden, Forest Grove, OR (US)

(73) Assignee: ESS Tech, Inc., Wilsonville, OR (US)

( * ) Notice: Subject to any disclaimer, the term of this patent is extended or adjusted under 35 U.S.C. 154(b) by 0 days.

(21) Appl. No.: 16/153,447

(22) Filed: Oct. 5, 2018

(65) Prior Publication Data

US 2020/0112040 A1    Apr. 9, 2020

(51) Int. Cl.
| | |
|---|---|
| *H01M 8/04186* | (2016.01) |
| *H01M 8/18* | (2006.01) |
| *H01M 8/04276* | (2016.01) |
| *H01M 8/04955* | (2016.01) |
| *H01M 8/04537* | (2016.01) |

(52) U.S. Cl.
CPC ... *H01M 8/04186* (2013.01); *H01M 8/04276* (2013.01); *H01M 8/04574* (2013.01); *H01M 8/04955* (2013.01); *H01M 8/188* (2013.01)

(58) Field of Classification Search
CPC ......... H01M 8/04186; H01M 8/04276; H01M 8/04574; H01M 8/04955; H01M 8/188
See application file for complete search history.

(56) References Cited

U.S. PATENT DOCUMENTS

| | | |
|---|---|---|
| 2011/0223450 A1 | 9/2011 | Horne et al. |
| 2017/0141420 A1 | 5/2017 | Sato et al. |
| 2017/0200936 A1 | 7/2017 | Evans et al. |
| 2018/0316032 A1 | 11/2018 | Song et al. |
| 2018/0316033 A1 | 11/2018 | Evans |

FOREIGN PATENT DOCUMENTS

| | | | | |
|---|---|---|---|---|
| JP | 2002015762 A | * | 1/2002 | |
| JP | 2013134120 A | * | 7/2013 | .......... H01M 10/425 |
| WO | 2006076059 A2 | | 7/2006 | |
| WO | 2018129026 A1 | | 7/2018 | |

OTHER PUBLICATIONS

EPO machine generated English translation of JP2013134120A (Year: 2013).*
Sunpower Electronics "Ground" (Year: 2016).*
EPO machine generated English translation of JP-2002015762-A (Year: 2002).*
ISA Korean Intellectual Property Office, International Search Report and Written Opinion Issued in Application No. PCT/US2019/051344, dated Jan. 3, 2020, WIPO, 10 pages.
Vanderzaden, A., "Power Conversion System and Method," U.S. Appl. No. 15/844,250, filed Dec. 15, 2017, 38 pages.

* cited by examiner

*Primary Examiner* — Christopher P Domone
*Assistant Examiner* — Kimberly Wyluda
(74) *Attorney, Agent, or Firm* — McCoy Russell LLP

(57) ABSTRACT

Systems and methods for operating an electric energy storage device are described. The systems and methods may reduce a voltage potential between a ground reference and terminals of an electric energy storage device. By lowering the voltage potential, a possibility of unintentionally discharging the electrical energy storage device to ground may be reduced.

14 Claims, 7 Drawing Sheets

POWER DELIVERY SYSTEM AND METHOD

FIELD

The present description relates to a system and method for sinking or sourcing electric power to or from an electric energy storage device. The methods and systems may be particularly useful for electrical power systems that include two electrolytes that are not in fluidic communication.

BACKGROUND AND SUMMARY

An electrical energy storage device may store electrical power that has been generated via an array of photovoltaic cells, wind turbines, hydroelectric generators, or other sources so that the electrical power may be delivered to electrical loads at a later time when output of the electrical power source may be low or when electrical loads are high. The electrical energy storage device may be comprised of a plurality of cells that may be coupled in series to increase the electrical potential of the electrical energy storage device. The electrical energy storage device may also include cells that are electrical coupled in parallel to increase the output capacity of the electrical energy storage device. As electrical potential of an electrical energy storage device increases, there may be a higher propensity for the electrical energy storage device to seek a lower electrical potential (e.g., earth ground) and discharge to the lower electrical potential. The possibility of discharging the electrical energy storage device to an object that is at a lower electrical potential may be reduced via increasing electrical insulation around and within the electrical energy storage device, but increasing the quantity and quality of the electrical insulation material may significantly increase cost of the electrical energy storage device. Therefore, it may be desirable to provide a way of reducing a possibility of unintentionally discharging an electric energy storage device to an object at lower electrical potential without substantially increasing cost of the electric energy storage device.

The inventors herein have recognized the above-mentioned issues and have developed an electrical power system, comprising: an electric energy storage cell including a positive reactor, a negative reactor, a barrier providing fluidic isolation between the positive reactor and the negative reactor, a first portion of a first electrolyte, and a first portion of a second electrolyte that is not in fluidic communication with the first electrolyte; a first fluidic passage housing a second portion of the first electrolyte that is in fluidic communication with the positive reactor; a second fluidic passage housing a second portion of the second electrolyte that is in fluidic communication with the negative reactor; and a metallic device that is in electrical communication with the first electrolyte and the second electrolyte, the metallic device electrically coupled to an earth ground reference.

By electrically coupling the first electrolyte and the second electrolyte to an earth ground reference, it may be possible to bias positive and negative terminals of an electric energy storage device with respect to earth ground so that a possibility of discharging the electric energy storage device to earth ground or an object that is near earth ground may be reduced. In particular, a voltage of an electrolyte distribution manifold may be referenced to earth ground so that a voltage between a positive terminal and earth ground may be significantly reduced as compared to if a negative terminal of an electric energy storage device were referenced to earth ground. Consequently, it may be possible to provide a desired level of discharge protection for an electric power system via reduced insulating material.

The present description may provide several advantages. In particular, the approach may reduce power system cost. Further, the approach may be applied in a variety of ways that allow for a flexible system. In addition, the approach may reduce system weight and improve system reliability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
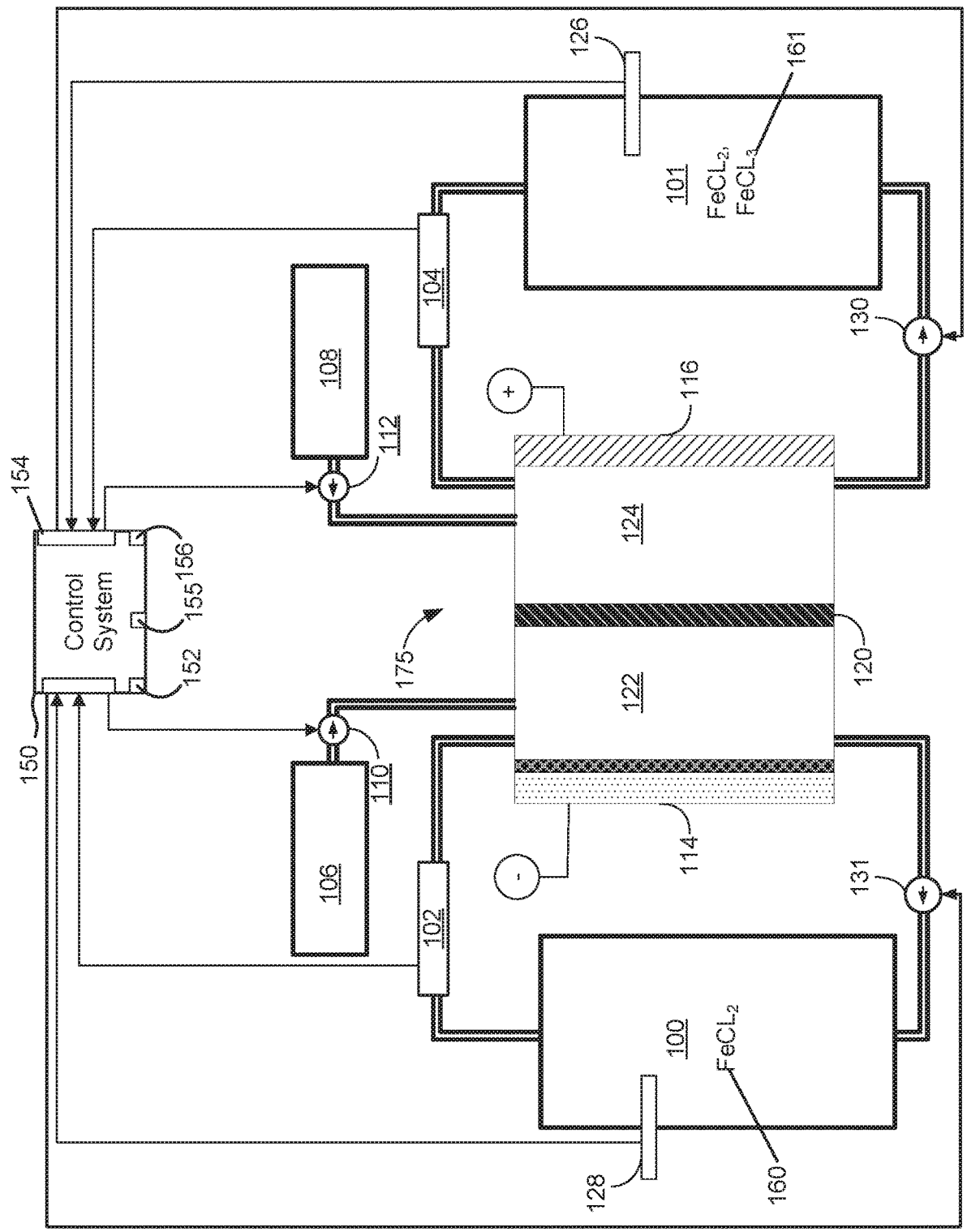
FIG. 1 is a schematic diagram showing a single cell of an electric power storage and delivery system.
Figure 2:
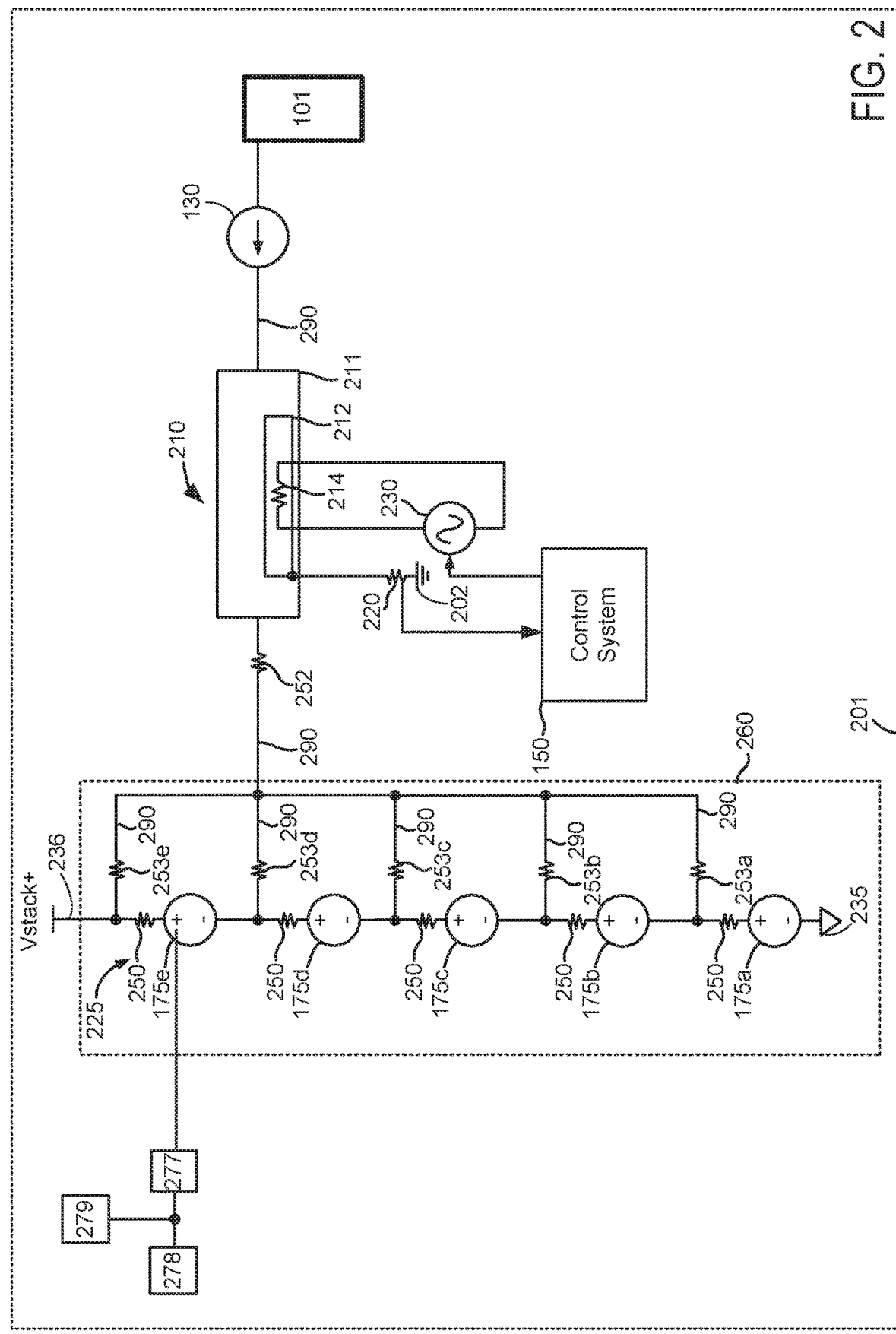
FIG. 2 is a schematic diagram of an electric power system in which a manifold voltage is reference to an earth ground potential.
Figure 3:
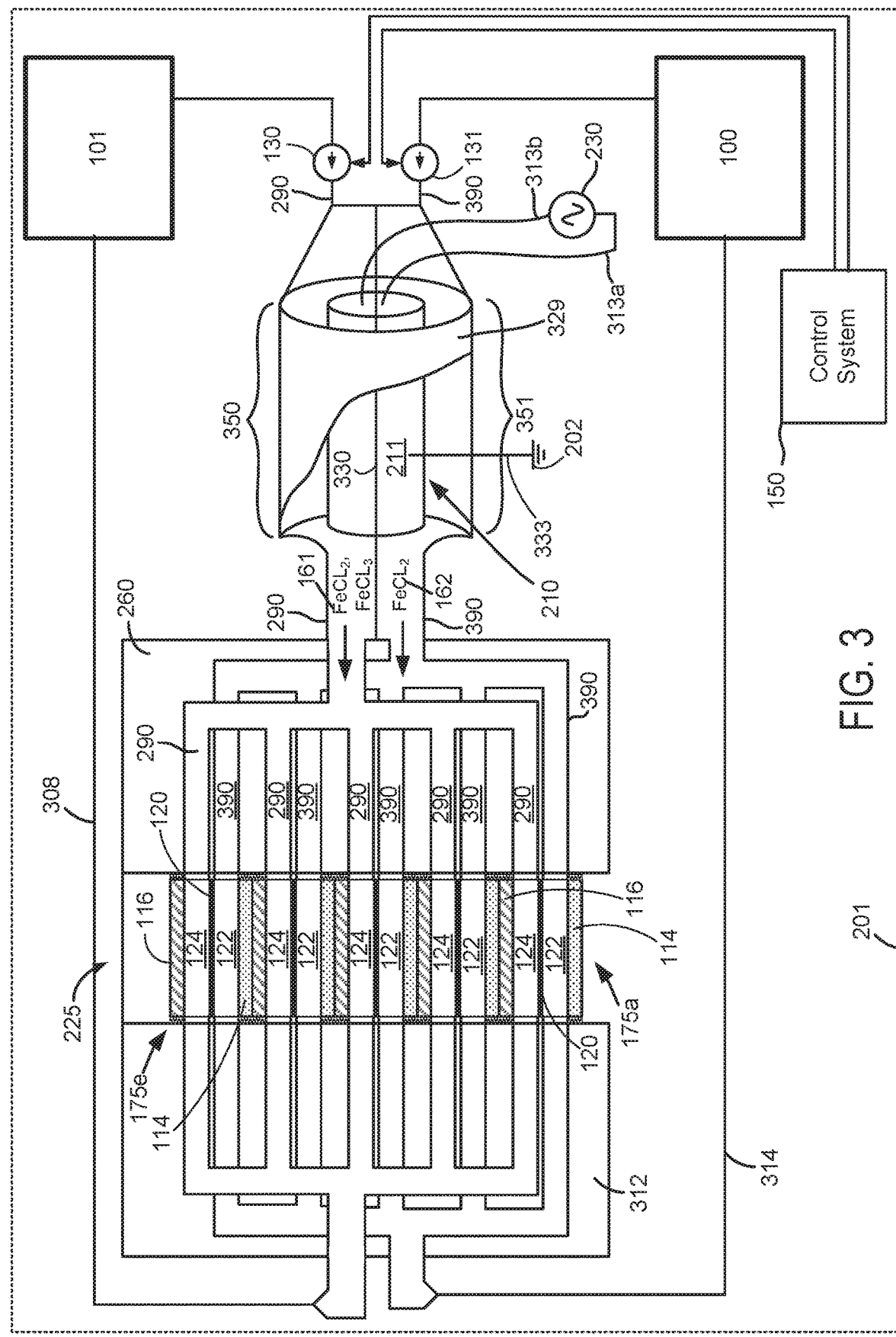
FIG. 3 shows a detailed schematic of one example of the electric power system of FIG. 2.
Figure 4:
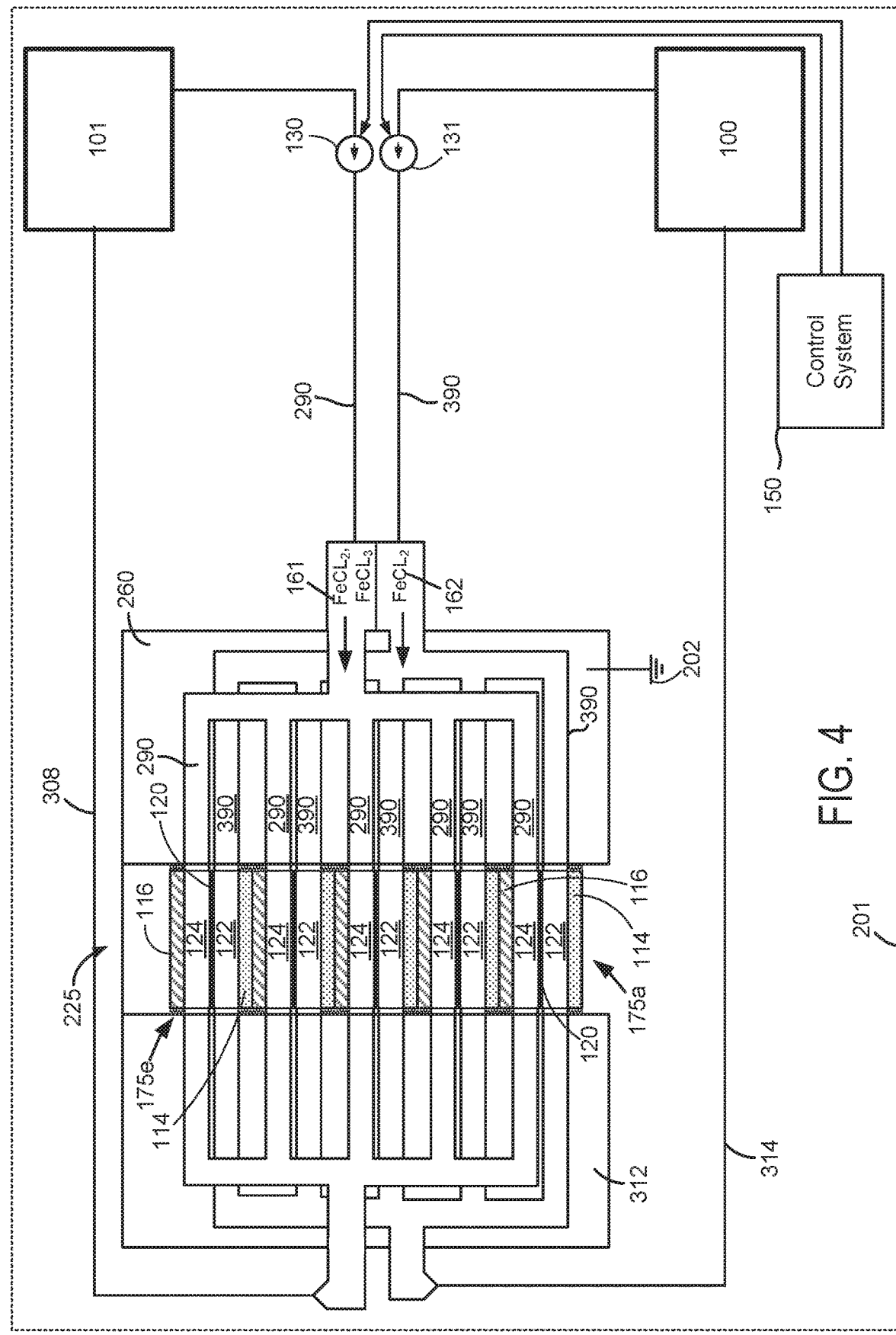
FIG. 4 shows a detailed schematic of a second example electric power system.

The present description is related to storing and delivering power via an electric energy storage device (e.g., a direct current (DC) power source) as shown in FIG. 1. The electric energy storage device may store electrical energy that is generated via photovoltaic cells, hydroelectric power, wind power, or via chemical energy. The electric energy storage device may output DC power that may be distributed as alternating current AC after a conversion process. The electric energy storage device may be an iron flow device as shown in FIGS. 1-6. The electric energy storage device may include a heater that is referenced to ground as shown in FIGS. 2 and 3. Alternatively, an electrolyte distribution manifold may be referenced to earth ground as shown in FIG. 4 to reduce an electrical potential between the electric energy storage device and a reference electrical potential (e.g., earth ground). In still other examples, a pump housing or impeller may be electrically coupled to a reference electrical potential to reduce the electrical potential between the electric energy storage device and the reference electrical potential. The systems of FIGS. 1-6 may be operated according to the method of FIG. 7 to store and deliver electrical power.

Referring to FIG. 1, an example of an all iron redox flow battery (IFB) cell is shown. The IFB cell 175 is an electric energy storage device. The IFB cell may be supplied with plating electrolyte 160 (e.g., $FeCL_2$) that is stored in plating electrolyte tank 100. The IFB may also include redox electrolyte 161 that is stored in redox electrolyte tank 101. The plating electrolyte and redox electrolyte may be a suitable salt dissolved in water, such as $FeCl_2$ or $FeCl_3$. Both the plating electrolyte and redox electrolyte may use the same salt at different molar concentrations, a feature of the IFB not available in batteries with different reactive compounds. Tank 100 may be in fluidic communication with negative reactor 122. Tank 101 may be in fluidic communication with positive reactor 124. Electrolyte in tank 100 and negative reactor 122 is in fluidic isolation from electrolyte in tank 101 and positive reactor 124. Separating the negative and positive reactors and their respective electrolytes is barrier 120. The barrier may embodied as a membrane barrier, such as an ion exchange membrane or a microporous membrane, placed between the plating electrolyte and redox electrolyte to prevent electrolyte cross-over and provide ionic conductivity.

Sensors 102 and 104 may be used to determine the chemical properties of the electrolyte, including pH and may be embodied as an optical sensor. Probes 126 and 128 may additionally or alternatively be used to determine the chemical properties (discussed below) of the electrolytes. Other examples may have a plating electrolyte probe, plating electrolyte sensor, redox electrolyte probe, redox electrolyte sensor, or some combination thereof. The probe may also be placed inside the reacting portion of the IFB in negative reactor 122 and positive reactor 124. An acid additive may be stored in additional tanks 106 and 108. These may contain different additives and be controlled by different routines. In other examples, the IFB may also have either a positive side additive or a negative side additive and not both. The positive side additive may be accelerated into the positive reactor 124 by positive additive pump 112, the negative additive may be accelerated into the negative reactor 122 by negative additive pump 110. Alternately, the electrolyte additives may be pumped into tanks 100 and 101. Pumps 110 and 112 may be actuated via a control system 150 communicatively coupled to the pumps. The control system may be responsive to probe 126, probe 128, sensor 102, sensor 104, or any combination thereof. Electrolyte may be pumped to or from the negative reactor 122 by pump 131. Electrolyte may be pumped to or from the positive reactor 125 via pump 130.

The IFB includes a negative electrode 114 and a positive electrode 116.

Control system 150 may include inputs and outputs 154 (e.g., digital inputs, digital outputs, analog inputs, analog outputs, pulse width outputs, etc.), a central processor 152, random-access memory 155, and read-only (e.g., non-transitory memory) 156.

Referring now to FIG. 2, a schematic block diagram of an electric power system that includes a plurality of the IFB cells 175a-175e shown in a circuit that includes modeled resistances. The schematic block diagram shows passages or conduits 290 that distribute electrolyte to the positive reactors of IFB cells 175a-175e. A similar schematic may be generated for electrolyte that is distributed to negative reactors of IFB cells 175a-175e, except that passages or conduits 290 would distributed to the negative reactors (e.g., 290 connections to the negative sides of 175a-175e).

The plurality of IFB cells 175a-175e are shown electrically coupled in series to increase an electrical potential of IFB cell stack 225, but additional cells may be coupled in parallel to increase the output capacity of IFB cell stack 225. In this example, IFB cell stack 225 is comprised of five cells electrically coupled in series, but the cell stack 225 may include from 1 to N cells connected in series where N is an integer number of a last cell in the cell stack 225. A lowest electrical potential 235 of IFB cell stack 225 is provided at a negative terminal of the first cell 175a. A highest electrical potential 236 of IFB cell stack 225 is provided at the positive terminal of $N^{th}$ cell 175e.

Resistances 250 represent the internal resistances of IFB cells 175a-175e, and each resistance 250 is nominally equal to the internal resistances 250 of the other IFB cells 175a-175e. Resistances 253a-253e represent cell to cell resistances in the manifold ant farm layout. Resistance 252 is a stack manifold to heater electrolyte distribution resistance (e.g., a resistance of the electrolyte in the passage between the electrolyte distribution manifold 260 and heater 210).

IFB cell stack 225 may receive electrical power from electric energy sources (e.g., photovoltaic cells, wind turbines, hydroelectric generators, etc.) 279. IFB cell stack 225 may also supply electrical power to electrical energy consumers (e.g., house hold appliances, industrial motors, vehicle propulsion sources, etc.) 278. Contactor 277 may be opened to electrically isolate IFB cell stack 225 from electrical energy sources 279 and electrical energy consumers 278. Likewise, contactor 277 may be closed to electrically couple IFB cell stack 225 to electrical energy sources 279 and electrical energy consumers 278. Electrical energy sources 279 and electrical energy consumers 278 are external to IFB cell stack 225.

Electrolyte may be distributed from tank 101 to IFB cell stack 225 via pump 130, heater 210, passages or conduits 290, and electrolyte distribution manifold 260. Alternatively, Electrolyte may be distributed from IFB cell stack 225 to tank 101 via pump 130, heater 210, passages or conduits 290, and electrolyte distribution manifold 260. Electrolyte may be heated as it passes through heater 210. In one example, heater 210 includes a metallic (e.g., titanium) housing 211 (e.g., a tubular housing) that covers and seals heating element (e.g., resistive) 214 from electrolyte. Housing 211 may be in electrical communication with a first electrolyte and a second electrolyte as shown in greater detail in FIG. 3. Heater 210 may also include a conductor 212 that electrically couples housing 211 to earth ground 202. A voltage may be generated across optional current sense resistor 220 when a current flows from housing 211 to earth ground 202. If controller 150 senses a current that is greater than a threshold amount of current via the voltage generated via resistor 220, controller 150 may deactivate IFB cell stack 225 by opening contactor 277 and deactivating pump 130. Electrolyte may be heated via power source 230 supplying electrical energy to heating element 214.

Referring now to FIG. 3, a detailed schematic of one example of the electric power system in FIG. 2 is shown. FIG. 3 includes some components that have been previously introduced in FIGS. 1 and 2. The numbering of these components is consistent in FIG. 3. The description of these components is consistent throughout the figures. Therefore, a description of previously introduced components is omitted for the sake of brevity. Newly identified components in FIG. 3 are included in the description of FIG. 3.

Electrolyte distribution manifold 260 is coupled to a plurality of IFB cells 175a-175e (175a and 175e are specifically identified) that form IFB cell stack 225. A first electrolyte 161 is supplied to positive reactors 124 and a second electrolyte is supplied to negative reactors 122.

Conduits or passages 290 supply the first electrolyte to positive reactors 124 via electrolyte distribution manifold 260 and via a section of conduits or passages coupling pump 130 to electrolyte distribution manifold 260. Likewise, conduits or passages 390 supply the second electrolyte to negative reactors 122 via electrolyte distribution manifold 260 and via a section of conduits or passages coupling pump 131 to electrolyte distribution manifold 260. Conduit or passage 290 includes a section 350 where first electrolyte 161 is enclosed in housing 329 and separated from second electrolyte 162 via heater 210 and baffle 330. Heater 210 is simultaneously in physical and electrical communication with first electrolyte 161 and second electrolyte 162. Baffle 330 extends from heater 210 to housing 329 such that first electrolyte 161 and second electrolyte 162 are not in fluidic communication. In addition, baffle 330 holds heater 330 stationary inside of housing 329. Baffle 330 may be welded or otherwise coupled to heater housing 211 and housing 329. Heater 210 may be activated via supplying power to heater 210 via conductors 313a and 313b and power source 230. Thus, heater 210 may simultaneously heat first electrolyte 161 and second electrolyte 162. Heater housing 211 is of metallic construction and it is directly electrically coupled to earth ground 202 via sole conductor 333. In this way, first electrolyte 161 and second electrolyte 162 may be reference to earth ground via heater housing 211 so that a voltage of a terminal of cell IFB stack 225 that has a highest electrical potential referenced to earth ground may be reduced as compared to what it would be if the negative terminal of IFB cell stack 225 with the lowest electrical potential were referenced to earth ground. As such, a possibility of unintended discharging IFB cell stack 225 may be reduced.

Pumps 130 and 131 supply the first electrolyte 161 and the second electrolyte from tanks 101 and 100. Once the first electrolyte and the second electrolyte 162 pass through positive and negative reactors 124 and 122, the first electrolyte 161 and the second electrolyte 162 are returned to tanks 101 and 100 via an electrolyte merging manifold 312 and passages or conduits 308 and 314.

Referring now to FIG. 4, a detailed schematic of a second example electric power system is shown. The system of FIG. 4 includes some components that have been previously introduced in FIGS. 1-3. The numbering of these components is consistent in FIG. 4. The description of these components is consistent throughout the figures. Therefore, a description of previously introduced components is omitted for the sake of brevity. Newly identified components in FIG. 4 are included in the description of FIG. 4.

In this system configuration, conduits or passages 290 and 390 supply first and second electrolytes to positive and negative reactors 124 and 122. The passages 290 and 390 extend from pumps 130 and 131 to electrolyte distribution manifold 260. Electrolyte distribution manifold 260 may be of metallic construction so that first electrolyte 161 and second electrolyte 162 may be referenced to a same electrical potential. In other words, electrolyte distribution manifold 260 provides a metallic conductive path for current flow between the first electrolyte 161 and the second electrolyte 162 while the first electrolyte 161 is not in fluidic communication with the second electrolyte 162. In this example, electrolyte distribution manifold 260 is electrically coupled to earth ground 202 so that first and second electrolytes may be referenced to a same reference level. This allows a voltage of a terminal of cell IFB stack 225 that has a highest electrical potential referenced to earth ground to be reduced as compared to what it would be if it were referenced to the lowest electrical potential negative terminal of IFB cell stack 225 and the lowest electrical potential negative terminal of IFB cell stack 225 was referenced to earth ground. Accordingly, a possibility of unintended discharging IFB cell stack 225 may be reduced.

First and second electrolytes 161 and 162 flow from electrolyte distribution manifold 260, through positive and negative reactors 124 and 122, and electrolyte merging manifold 312 before returning to tanks 100 and 101. In this example, heater 210 is not shown, but one may be included if desired. However, if heater 210 is included, heater 210 is not referenced to earth ground because electrolyte distribution manifold 260 is referenced to ground. In an alternative example, electrolyte merging manifold 312 may be of metallic construction and it may be electrically coupled to earth ground instead of electrolyte distribution manifold 260. Additionally, a current sense resistor may be provided between earth ground 202 and electrolyte distribution manifold 260 for ground fault detection.

Figure 5:
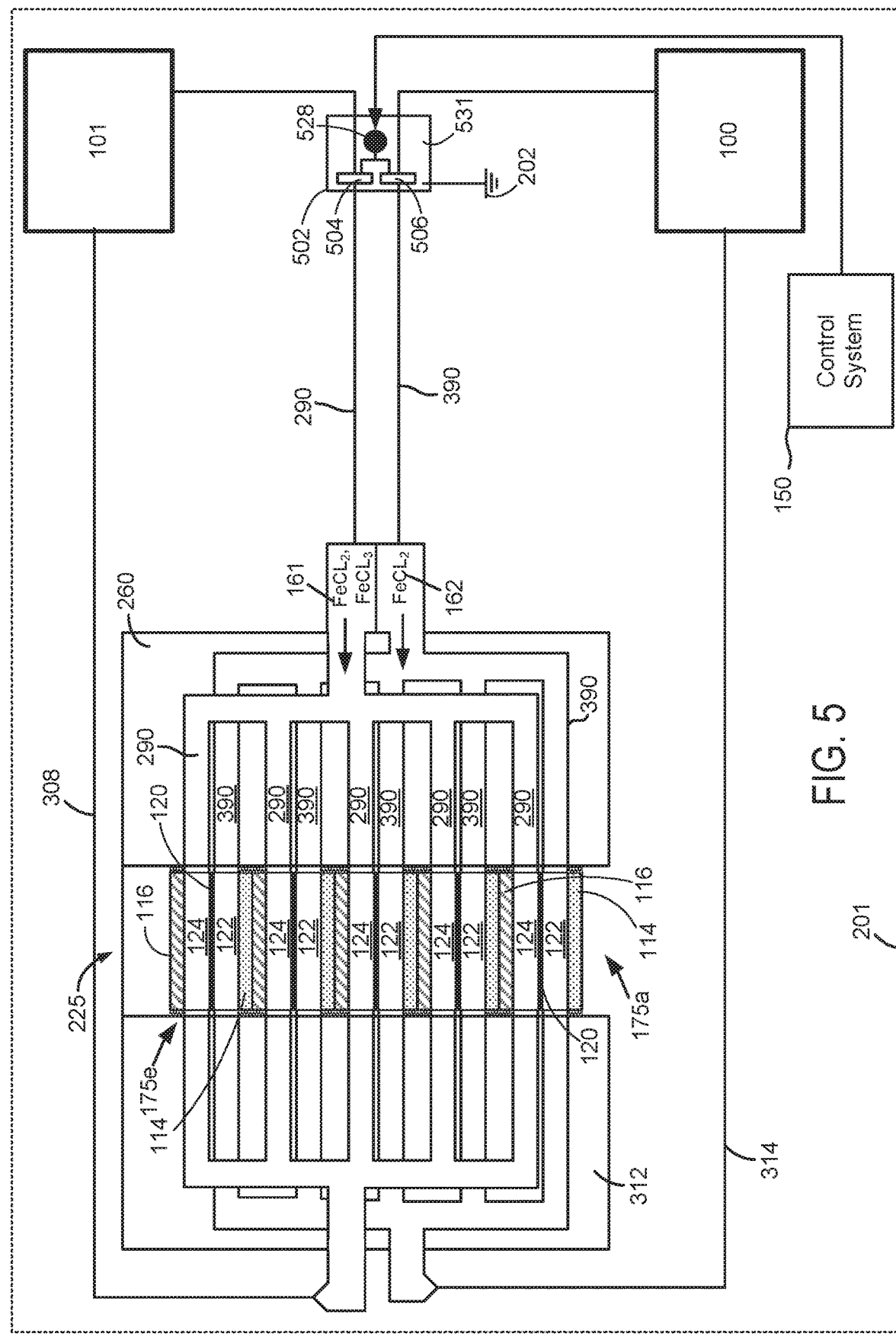
FIG. 5 shows a detailed schematic of a third example electric power system.

Referring now to FIG. 5, a detailed schematic of a third example electric power system is shown. The system of FIG. 5 includes some components that have been previously introduced in FIGS. 1-3. The numbering of these components is consistent in FIG. 5. The description of these components is consistent throughout the figures. Therefore, a description of previously introduced components is omitted for the sake of brevity. Newly identified components in FIG. 5 are included in the description of FIG. 5.

In this system configuration, conduits or passages 290 and 390 again supply first and second electrolytes 161 and 162 to positive and negative reactors 124 and 122. However, a single pump 531 provides motive force to first electrolyte 161 and second electrolyte 162 while there is no fluidic communication between first electrolyte 161 and second electrolyte 162. Sole pump 531 includes first impeller 504 that operates on first electrolyte 161 and second impeller 506 that operates on second electrolyte 162. First impeller 504 and second impeller 506 are rotated via motor 528. Pump 531 includes a housing 502 that may be of metallic construction so that first electrolyte and second electrolyte may be referenced to a same electrical potential. Housing 502 is electrically coupled to earth ground 202. In other words, housing 502 provides a metallic conductive path for current flow between the first electrolyte and the second electrolyte while the first electrolyte is not in fluidic communication with the second electrolyte. This allows a voltage of a terminal of cell IFB stack 225 that has a highest electrical potential referenced to earth ground to be reduced as compared to what it would be if it were referenced to the lowest electrical potential negative terminal of IFB cell stack 225 and the lowest electrical potential negative terminal of IFB cell stack 225 was referenced to earth ground. Accordingly, a possibility of unintended discharging IFB cell stack 225 may be reduced.

This example illustrates a pump with two impellers and a single motor, but other configurations may include two motors and two impellers in a single housing so that a metallic conductive path for current flow between the first electrolyte and the second electrolyte may be maintained.

First and second electrolytes flow from electrolyte distribution manifold 260, through positive and negative reactors 124 and 122, and electrolyte merging manifold 312 before returning to tanks 100 and 101. In this example, heater 210 is not shown, but one may be included if desired. However, if heater 210 is included, heater 210 is not referenced to earth ground because housing 502 is referenced to ground. Additionally, a current sense resistor may be provided between earth ground 202 and housing 502 for ground fault detection.

Figure 6:
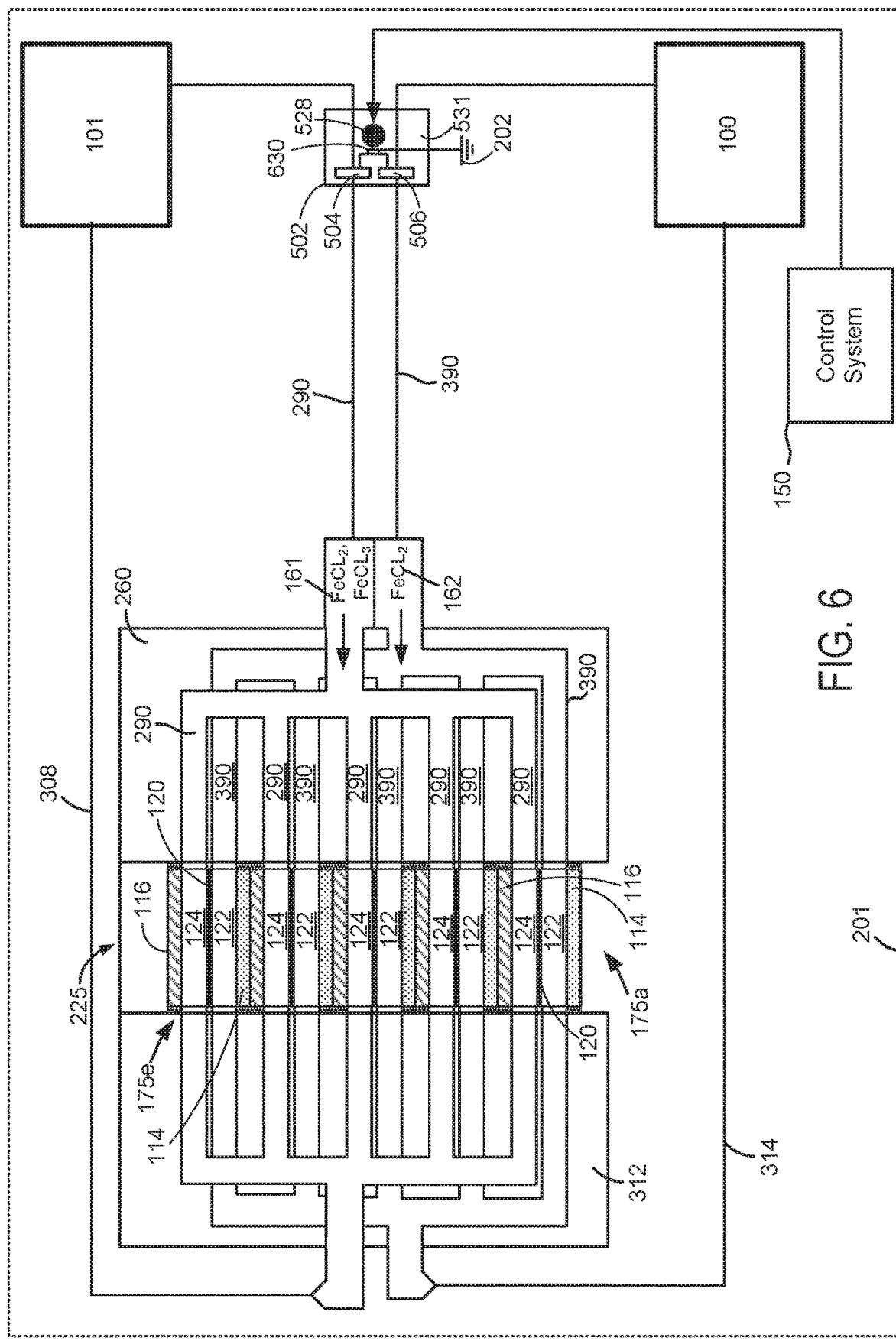
FIG. 6 shows a detailed schematic of a fourth example electric power system.

Referring now to FIG. 6, a detailed schematic of a third example electric power system is shown. The system of FIG. 6 includes some components that have been previously introduced in FIGS. 1-5. The numbering of these components is consistent in FIG. 6. Therefore, a description of previously introduced components is omitted for the sake of brevity. Newly identified components in FIG. 6 are included in the description of FIG. 6.

The system of FIG. 6 includes a pump 531 that is similar to pump 531 in FIG. 5, but pump 531 in this example includes slip rings 630 or a different known device that permits impellers 506 and 504 to be electrically coupled to earth ground 202. Impellers 504 and 506 may be of metallic construction. Impellers 504 and 506 are in electrical communication with each other such that there is a metallic conductive path for current flow between the first electrolyte and the second electrolyte while the first electrolyte is not in fluidic communication with the second electrolyte. This allows a voltage of a terminal of cell IFB stack 225 that has a highest electrical potential referenced to earth ground to be reduced as compared to what it would be if it were referenced to the lowest electrical potential negative terminal of IFB cell stack 225 and the lowest electrical potential negative terminal of IFB cell stack 225 was referenced to earth ground. Accordingly, a possibility of unintended discharging IFB cell stack 225 may be reduced. The housing 502 may be non-metallic.

Thus, the systems of FIGS. 1-6 provide for an electrical power system, comprising: an electric energy storage cell including a positive reactor, a negative reactor, a barrier providing fluidic isolation between the positive reactor and the negative reactor, a first portion of a first electrolyte, and a first portion of a second electrolyte that is not in fluidic communication with the first electrolyte; a first fluidic passage housing a second portion of the first electrolyte that is in fluidic communication with the positive reactor; a second fluidic passage housing a second portion of the second electrolyte that is in fluidic communication with the negative reactor; and a metallic device that is in physical and electrical communication with the first electrolyte and the second electrolyte, the metallic device electrically coupled to a reference electrical potential. The electric power system includes where the reference electrical potential is an earth ground potential, and further comprising: at least one pump that is in fluidic communication with the first fluidic passage. The electric power system further comprises at least one pump that is in fluidic communication with the second fluidic passage. Thus, the metallic device may be contemporaneously touching both the first electrolyte and the second electrolyte.

In some examples, the electric power system includes where the metallic device is positioned along the first and second fluidic passages. The electric power system includes where the metallic device is a fluid manifold that directs the first electrolyte and the second electrolyte to a plurality of electric energy storage cells. The electric power system includes where the metallic device is a heating element. The electric power system includes where the metallic device is a housing of a pump. The electric power system includes where the metallic device is an impeller of a pump.

The system of FIGS. 1-6 also provides for an electrical power system, comprising: a plurality of electric energy storage cells, each of the plurality of electric energy storage cells including a positive reactor, a negative reactor, a barrier providing fluidic isolation between the positive reactor and the negative reactor, a first portion of a first electrolyte, and a first portion of a second electrolyte that is not in fluidic communication with the first electrolyte; a manifold including a plurality of passages including the first electrolyte and the second electrolyte; one or more pumps configured to deliver the first electrolyte and the second electrolyte to the plurality of electric energy storage cells; and a metallic device that is in physical and electrical communication with the first electrolyte and the second electrolyte, the metallic device electrically coupled to a reference electrical potential. The electric power system includes where the reference electrical potential is an earth ground potential, and where the metallic device is directly electrically coupled to the earth ground potential.

In some examples, the electric power system includes where the reference electrical potential is an earth ground potential, and where the metallic device is electrically coupled to the earth ground potential via a current sensing device. The electrical power system further comprises a controller including executable instructions stored in non-transitory memory for deactivating the electrical power system in response to an electrical current that is greater than a threshold current flowing through the current sensing device. The electrical power system includes where deactivating the electrical power system includes deactivating the one or more pumps. The electrical power system includes where the metallic device is a heating element.

Figure 7:
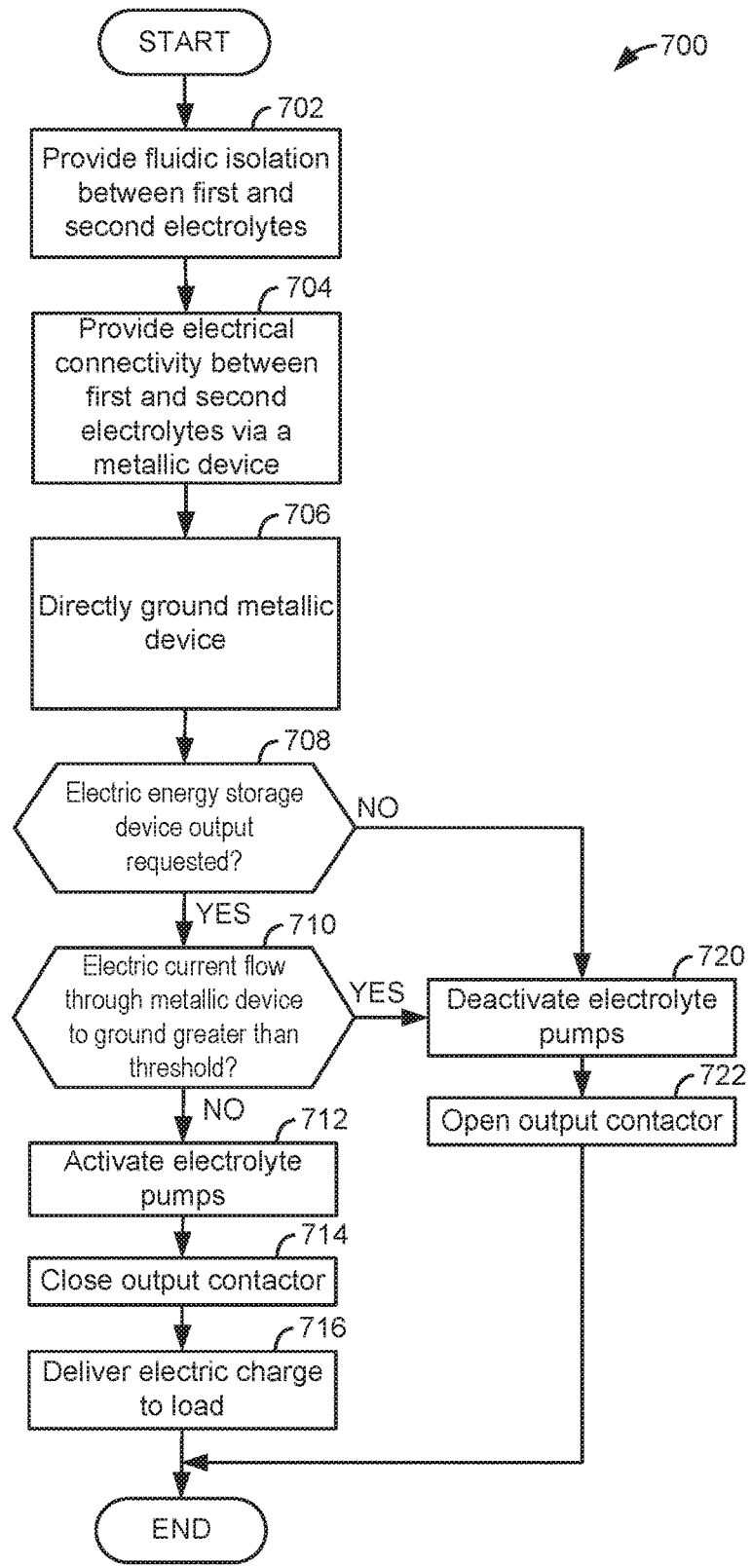
FIG. 7 shows a flowchart of a method for operating the systems of FIGS. 1-6.

Referring now to FIG. 7, a method for operating the electric energy system as shown in FIGS. 1-6 is shown. Portions of method of FIG. 7 may be included as executable instructions stored in non-transitory memory of the system of FIGS. 1-7, while other portions of the method may be performed via humans or robots. In addition, the methods of FIG. 7 may work in cooperation with the system of FIGS. 1-6 to receive data and adjust actuators to control the system of FIGS. 1-6 or external systems in the physical or real world.

At 702, fluidic isolation is provided between a first electrolyte and a second electrolyte. The fluidic isolation may be provided via transporting the first and second electrolytes in closed passages or conduits. Further, the fluidic isolation may be maintained in electric energy storage cells via a membrane. The first and second electrolytes may also be maintained in separate tanks. Method 700 proceeds to 704.

At 704, method 700 provides electrical connectivity between the first electrolyte and the second electrolyte via a metallic device (e.g., a pump housing, pump impeller, heater housing, electrolyte manifold, etc.). The first electrolyte and the second electrolyte may be in direct physical contact with the device. Method 700 proceeds to 706.

At 706, method 700 the device is directly coupled to earth ground. Alternatively, the device may be directly coupled to a current sense resistor and the current sense resistor may be directly coupled to earth ground. A single or sole connection between the electrical power system and earth ground may be made via the device described at 704. Method 700 proceeds to 708.

By providing electrical communication between the first and second electrolytes via a metallic device and electrically coupling the metallic device to earth ground potential, it may be possible to reduce electrical potential between highest and lowest electrical potential terminals of the power system and earth ground or another electrical reference potential to approximately:

$$V_{stack-} = -V_{OC} \cdot \frac{N}{2}$$

$$V_{stack+} = V_{OC} \cdot \frac{N}{2}$$

where $V_{stack-}$ is the voltage at the lowest potential terminal of the IFB cell stack referenced to earth ground, $V_{oc}$ is the average open circuit cell voltage, N is the actual total number of cells in the cell stack, and where $V_{stack+}$ is the voltage at the highest potential terminal of the IFB cell stack referenced to earth ground.

At 708, method 700 judges if operation of the electric power system is desired. Operation of the electric power system may be desired when it is desired for the electric power system to store charge from a power source or when it is desired for the electric power system to deliver charge to an electrical power consumer. Operation of the electric power system may be requested via a switch or via exchange of data between two controllers. If operation of the electric power system is requested, the answer is yes and method 700 proceeds to 710. Otherwise, the answer is no and method 700 proceeds to 720.

At 720, method 700 deactivates one or more electrolyte pumps (e.g., ceases to rotate the pumps and ceases to supply energy to the pumps). Method 700 proceeds to 722.

At 722, method 700 opens an electrical contactor (e.g., switch) and electrically isolates the electric power system from external power sources and loads. Method 700 proceeds to exit.

At 712, method 700 activates one or more electrolyte pumps (e.g., rotates the pumps and supplies energy to the pumps). Method 700 proceeds to 714.

At 714, method 700 closes an electrical contactor and electrically couples the electric power system to external power sources and loads. Method 700 proceeds to 716.

At 716, the electrical power system receives charge from external power systems and/or delivers electrical power to electrical power consumers. Method 700 proceeds to exit.

In this way, it may be possible to reduce a voltage level between a power system and a reference voltage (e.g., earth ground). While this description mentions earth ground as a reference voltage level, a different reference level (e.g., a reference level of an external electrical system) may be substituted for earth ground without departing from the scope or spirit of this disclosure. Further, earth ground may be an electrical potential that may be observed at a metal rod after the metal rod has been driven into the earth's surface to a predetermined depth.

The method of FIG. 7 provides for a method for an electric power system, comprising: supplying a first electrolyte a positive reactor of an electric energy storage device and a second electrolyte to a negative reactor of the electric energy storage device, the first electrolyte not in fluidic communication with the second electrolyte; and electrically coupling the first electrolyte to the second electrolyte via a metallic device, the metallic device in physical contact with the first electrolyte and the second electrolyte. The method further comprises electrically coupling the metallic device to an earth ground potential. The method further comprises deactivating the electric energy storage device in response to an electrical current flowing between the earth ground potential and the metallic device being greater than a threshold electrical current. The method further comprises heating the first electrolyte and the second electrolyte via the metallic device. The method further comprises supplying the first electrolyte and the second electrolyte via a single pump that includes the metallic device. The method includes where the metallic device is an impeller of the single pump.

Note that the example control and estimation routines included herein can be used with various power conversion system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various described hardware components in combination with one or more controllers.

This concludes the description. The reading of it by those skilled in the art would bring to mind many alterations and modifications without departing from the spirit and the scope of the description. For example, different components within the power system may be electrically coupled to earth ground and the first and second electrolytes to reduce electrical potentials between an electric power system and earth ground.

The invention claimed is:

1. An electrical power system, comprising:
an electric energy storage cell including a positive reactor, a negative reactor, a barrier providing fluidic isolation between the positive reactor and the negative reactor, a first portion of a first electrolyte, and a first portion of a second electrolyte that is not in fluidic communication with the first electrolyte;
a first fluidic passage housing a second portion of the first electrolyte that is in fluidic communication with the positive reactor;
a second fluidic passage housing a second portion of the second electrolyte that is in fluidic communication with the negative reactor; and
a metallic device that is in electrical communication with the first electrolyte and the second electrolyte, the metallic device electrically coupled to a reference electrical potential,
wherein the metallic device is in direct physical contact with the second portion of the first electrolyte; and
wherein the metallic device is in direct physical contact with the second portion of the second electrolyte.

2. The electrical power system of claim 1, where the reference electrical potential is an earth ground potential, and further comprising:
at least one pump that is in fluidic communication with the first fluidic passage.

3. The electrical power system of claim 2, further comprising at least one pump that is in fluidic communication with the second fluidic passage.

4. The electrical power system of claim 1, where the metallic device is positioned along the first and second fluidic passages.

5. The electrical power system of claim 1, where the metallic device is a fluid manifold that directs the first electrolyte and the second electrolyte to a plurality of electric energy storage cells.

6. The electrical power system of claim 1, where the metallic device is a heating element.

7. The electrical power system of claim 1, where the metallic device is a housing of a pump.

8. The electrical power system of claim 1, where the metallic device is an impeller of a pump.

9. An electrical power system, comprising:
a plurality of electric energy storage cells, each of the plurality of electric energy storage cells including a positive reactor, a negative reactor, a barrier providing fluidic isolation between the positive reactor and the negative reactor, a first portion of a first electrolyte, and a first portion of a second electrolyte that is not in fluidic communication with the first electrolyte;
a manifold including a plurality of passages including the first electrolyte and the second electrolyte;
one or more pumps configured to deliver the first electrolyte and the second electrolyte to the plurality of electric energy storage cells; and
a metallic device that is in electrical communication with the first electrolyte and the second electrolyte, the metallic device electrically coupled to a reference electrical potential,
wherein the metallic device is in direct physical contact with a second portion of the first electrolyte that is in fluidic communication with the positive reactor; and
wherein the metallic device is in direct physical contact with a second portion of the second electrolyte that is in fluidic commination with the negative reactor.

10. The electrical power system of claim 9, where the reference electrical potential is an earth ground potential, and where the metallic device is directly electrically coupled to the earth ground potential.

11. The electrical power system of claim 9, where the reference electrical potential is an earth ground potential, and where the metallic device is electrically coupled to the earth ground potential via a current sensing device.

12. The electrical power system of claim 11, further comprising a controller including executable instructions stored in non-transitory memory for deactivating the electrical power system in response to an electrical current that is greater than a threshold current flowing through the current sensing device.

13. The electrical power system of claim 12, where deactivating the electrical power system includes deactivating the one or more pumps.

14. The electrical power system of claim 9, where the metallic device is a heating element.

* * * * *